July 21, 1931.   H. LAURITANO   1,815,855
METER INSTALLATION
Filed Sept. 25, 1929

HENRY LAURITANO
INVENTOR

BY *Victor J. Evans*
ATTORNEY

Patented July 21, 1931

1,815,855

UNITED STATES PATENT OFFICE

HENRY LAURITANO, OF SPRINGFIELD GARDENS, NEW YORK

METER INSTALLATION

Application filed September 25, 1929. Serial No. 395,191.

This invention relates to meter installations, and more particularly to a device for positioning and supporting a meter at the wall of a building or the like, so that the face of the meter may be conveniently read from the exterior of the building.

Meter inspectors employed by public utility concerns, such as gas, electric and water companies are frequently confronted with difficulty in the prompt and efficient performance of their work by reason of the fact that it is impossible to gain access to the meters located in cellars of buildings, mainly private dwellings or small houses, for the purpose of reading the meter, or shutting off the supply, or otherwise.

The primary object of this invention is to enable the meter to be positoined in the cellar or other part of the building and yet be accessible from the exterior by authorized parties, for purposes of reading or otherwise.

A further object is to provide a device which can be installed at the time the wall is built as well as subsequently, so that the device forms part of the foundation or other wall itself.

A still further object is to provide a meter installation equipment which will be weatherproof and foolproof when installed.

Another object is to enable the equipment to be adjustable for use with walls of any standard thickness.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter shows an embodiment of the invention as at present preferred.

In the drawings:—

Figure 1:
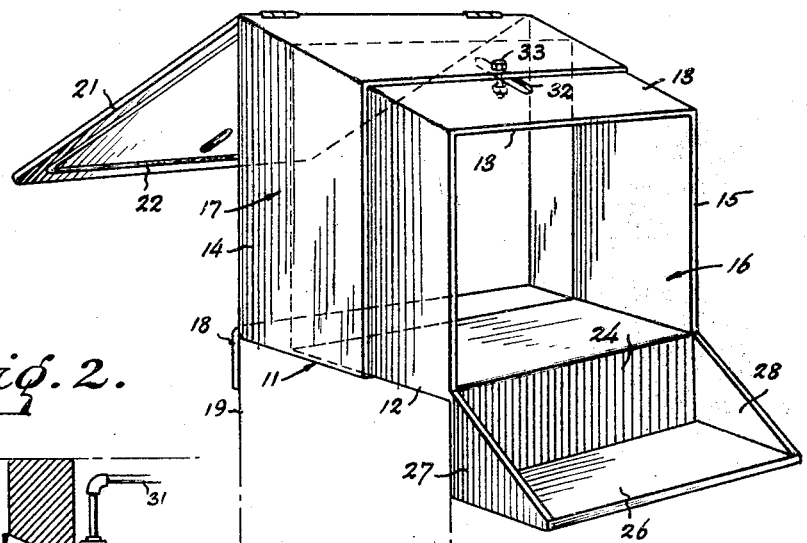
Figure 1 is a perspective view of the meter installation receptacle itself.

The meter installation equipment 10 in this instance includes a hollow sheet metal casing or receptacle 11, preferably rectangular in cross section, having in this instance a horizontal bottom 12, an inclined top 13 and opposite side walls 14 and 15, thus providing a rectangular opening 16 at the interior of the casing and a somewhat larger rectangular opening 17 at the exterior.

The bottom 12 has a downturned lip 18 at the exterior adapted to abut against the outer surface 19 of the building wall; and a hinged cover 21 is provided at the outside end of the top 13 to enclose the opening 17. Suitable packing 22 may be provided around the inner sides of the cover 21 to engage the outer portions of the receptacle to render the same weatherproof; and suitable locking means 23, co-operative between the cover 21 and the lip 18 of the receptacle, are provided to protect the interior from unauthorized parties.

At the interior end of the bottom, in this instance, has a downturned apron 24 to abut against the inner surface 25 of the building wall, this apron 24 having a horizontal rearward extension forming a shelf portion 26. Suitable side arms 27 and 28 are formed out of the metal of the casing, to support the shelf 26, as well as to hold the meter to be supported on the shelf in position.

Figure 2:
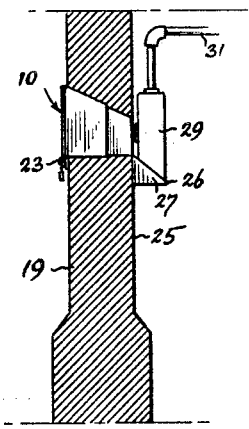
Figure 2 is a transverse sectional view through the building wall showing the installation in place.

The meter 29, which may be for gas, or water, or electricity, or otherwise, is adapted to be placed on the shelf 26 with its dial portion 30 at the opening 16 and facing outward toward the opening 17, as seen in Figure 2. The receptacle 11 and shelf 26 are preferably so proportioned as to readily position the meter for this purpose.

When the meter is a gas meter, the gas main 31 is preferably located just above the meter installation, so that the meters can be supported by the gas pipes as well as by the shelf 26. With water meters, the meter can also be supported by the water main in like manner. Electric meters can have the switches, fuse box and other connections mounted on the shelf 26, apron 24, or other parts of the receptacle. With each type of meter the receptacle is located at the appropriate height on the building wall; and a single building wall may include a plurality of receptacles for different meters. Also, for buildings where a plurality of meters of the same company are used, the device may be constructed to accommodate more than one meter at each receptacle.

The meter installation equipment shown herein is primarily adapted to be built into the foundation or other wall during the construction of the latter; though, of course, it can be set in place after the wall has been built, if desired, by knocking out a portion of the wall for insertion of the receptacle, which latter may be cemented or otherwise secured in place.

The cover of the receptacle is substantially flush with the outer surface of the building wall, so that the appearance of the wall is not detracted from.

To enable the receptacle 11 to be used with building walls of different width, the receptacle may be made adjustable, as for instance by constructing forward and rearward portions in telescoping relation with slots 32 at the meeting telescoping portions to receive suitable bolts 33. The shelf 26 may be constructed for adjustability in a like manner.

Figure 3:
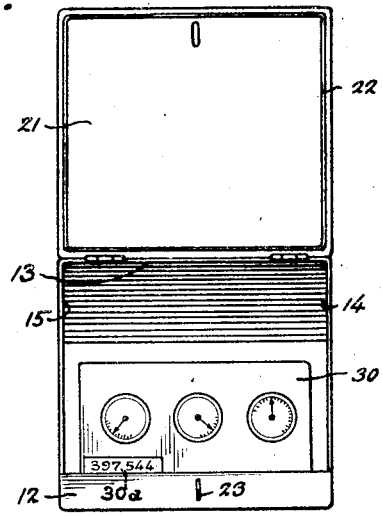
Figure 3 is a front elevation of the equipment with the meter dials exposed for outside inspection.
Figure 4:
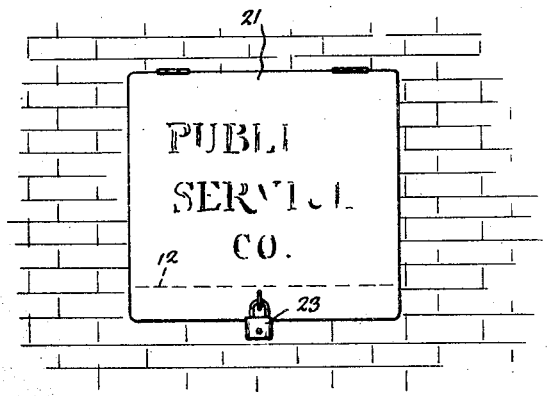
Figure 4 is a front elevation of the equipment as it appears on the exterior of the wall when closed and locked.

With the meter in position as shown in Figures 2 and 3, and the outer cover 21 locked as shown in Figure 4, the meter is inaccessible to any but authorized persons. The cover is weatherproof so that wind or rain cannot beat into the receptacle. Opening the cover 21 as seen in Figure 3 renders the dials of the meter visible at the inner end of the receptacle. The serial number of the meter, indicated at 30a, is also conveniently seen from the exterior of the building.

The present meter installation furnishes a very convenient means for rendering the meters accessible to the various public utility companies at all times, as well as to the owner or tenant of the building who may also be provided with a key for the cover 21. Thus the meters may be read whether the tenant or owner is at home or not; thereby resulting in a marked economy of labor and time. The receptacle can also provide for access to a shut-off device associated with the meter, so that the service may be interrupted in any emergency or other contingency.

The hereinbefore described constructions admits of considerable modifications without departing from the invention; therefore, I do not wish to be limited to the precise arrangements shown and described, which are, as aforesaid, by way of illustration merely. In other words, the scope of protection contemplated is to be taken solely from the appended claims, interpreted as broadly as is consistent with the prior art.

What I claim is:—

1. In a meter installation equipment comprising in combination with a building wall, a hollow receptacle having an exterior and an interior opening, a hinged cover for said exterior opening, said cover and receptacle including co-operative locking means, and a shelf on said receptacle adapted to support a meter or the like whereby the dials thereof are presented at said interior opening in position to be visible from the exterior of the building when said cover is open.

2. In a meter installation equipment comprising in combination with a building wall, a hollow sheet metal receptacle having exterior and interior openings, said bottom having a downturned lip at the exterior opening to abut against the side of a building wall or the like, a hinged cover for said exterior opening, said cover and the lip of said receptacle including co-operative locking means, the bottom of said receptacle having a downturned apron at the opposite end adapted to abut against the inner surface of the building wall, said apron having a forwardly extending shelf adapted to support a meter or the like so that the dials thereof are presented at said interior opening in position to be visible from the exterior of the building, and brackets to support said shelf.

3. In a meter installation equipment comprising in combination with a building wall, a hollow sheet metal receptacle including a substantially horizontal bottom, vertical side walls and an inclined top, and having a large exterior opening and a smaller interior opening, said bottom having a downturned lip at the exterior opening to abut against the side of a building wall or the like, a hinged cover for said exterior opening, said cover and the lip of said receptacle including co-operative locking means, means effective between the cover and casing to weatherproof the receptacle at the exterior, the bottom of said receptacle having a downturned apron at the opposite end adapted to abut against the inner surface of the building wall, said apron having a forwardly extending shelf adapted to support a meter or the like so that the dials thereof are presented at said interior opening in position to be visible from the exterior of the building, and brackets on the receptacle to support said shelf.

4. In a meter installation receptacle including bottom and top portions, and having a large exterior opening and a smaller interior opening, a hinged cover for said exterior opening, said cover and receptacle including co-operative locking means, means effective between the cover and casing to weatherproof the receptacle at the exterior, the bottom of said receptacle having a forwardly extending shelf adapted to support a meter or the like so that the dials thereof are presented at said interior opening in position to be visible from the exterior of the building, and brackets on the receptacle to support said shelf.

5. In a meter installation equipment comprising in combination a hollow sheet metal receptacle having an exterior opening and an interior opening, a hinged cover for said exterior opening, said cover and receptacle including co-operative locking means, said receptacle having a shelf at the opposite end extending from the inner surface of the building wall, said shelf adapted to support a meter or the like so that the dials thereof are presented at said interior opening in position to be visible from the exterior of the building, when said cover is open, said receptacle being divided into outer and inner telescoping portions, and means to secure said portions together in adjusted relation.

6. A meter installation equipment comprising, in combination with a building wall, a hollow sheet metal receptacle including a substantially horizontal bottom, vertical side walls and an inclined top, and said receptacle having a large exterior opening and a smaller interior opening, said bottom having a downturned lip at the exterior opening to abut against the side of a building wall or the like, a hinged cover for said large exterior opening, said cover and the lip of said receptacle including co-operative locking means, means effective between the cover and casing to weatherproof the receptacle at the exterior, the bottom of said receptacle having a downturned apron at the opposite end adapted to abut against the inner surface of the building wall, said apron having a forwardly extending shelf adapted to support a meter or the like so that the dials thereof are presented at said interior opening in position to be visible from the exterior of the building and brackets to support said shelf, said receptacle being divided into outer and inner telescoping portions, and means to secure said portions together in adjusted relation.

In testimony whereof I hereby affix my signature.

HENRY LAURITANO.